Figure 1:
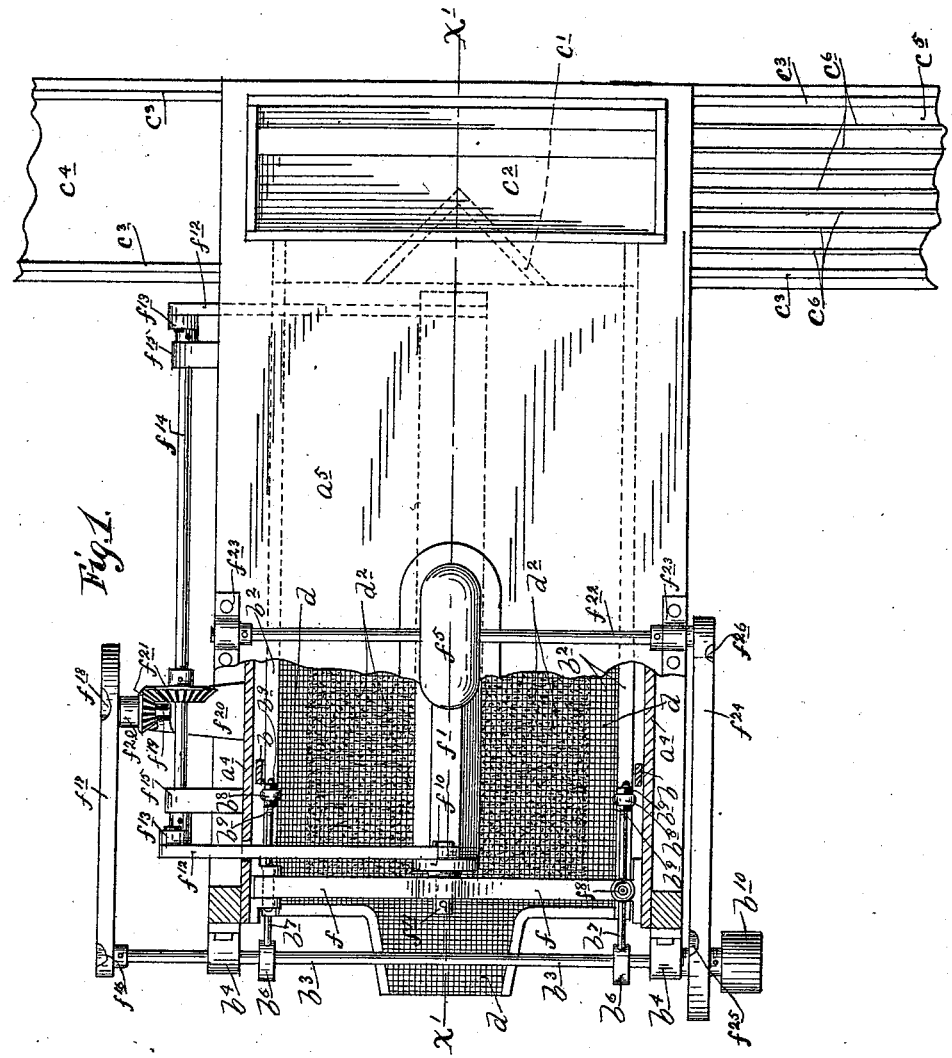

(No Model.) 3 Sheets—Sheet 1.
G. CARLSON.
APPARATUS FOR SCOURING AND CLEANING CANDIES.
No. 527,662. Patented Oct. 16, 1894.

Witnesses
E. F. Elmore
Frank D. Merchant

Inventor.
Gabriel Carlson
By his Attorney,
Jas. F. Williamson (No Model.) 3 Sheets—Sheet 2.

G. CARLSON.
APPARATUS FOR SCOURING AND CLEANING CANDIES.

No. 527,662. Patented Oct. 16, 1894.

Witnesses.
E. F. Elmore
R. D. Merchant

Inventor.
Gabriel Carlson,
By his Attorney,
Jas. F. Williamson

THE NORRIS PETERS CO., PHOTO-LITHO., WASHINGTON, D. C.

(No Model.) 3 Sheets—Sheet 3.
G. CARLSON.
APPARATUS FOR SCOURING AND CLEANING CANDIES.
No. 527,662. Patented Oct. 16, 1894.

Witnesses.
E. F. Elmore
Frank D. Merchant

Inventor.
Gabriel Carlson
By his Attorney,
Jas. F. Williamson

UNITED STATES PATENT OFFICE.

GABRIEL CARLSON, OF MINNEAPOLIS, MINNESOTA.

APPARATUS FOR SCOURING AND CLEANING CANDIES.

SPECIFICATION forming part of Letters Patent No. 527,662, dated October 16, 1894.

Application filed March 31, 1894. Serial No. 505,805. (No model.)

*To all whom it may concern:*

Be it known that I, GABRIEL CARLSON, a citizen of the United States, residing at Minneapolis, in the county of Hennepin and State of Minnesota, have invented certain new and useful Improvements in Apparatus for Scouring and Cleaning Candies, &c.; and I do hereby declare the following to be a full, clear, and exact description of the invention, such as will enable others skilled in the art to which it appertains to make and use the same.

My invention has for its object to provide an improved apparatus for scouring and cleaning candies, confections, and other materials.

It is well known, to persons skilled in the art, that candies and confections are molded and dried in a body of starch or other similar finely divided dry material. After the candies have been molded and dried, they are separated from the starch, and the trays and molding material are used over and over again. The candies and confections being of a plastic nature, and often of a form or design having a rough external surface, difficulty is always experienced in entirely removing therefrom the powdered starch in which they were molded and dried. This work of scouring and cleaning the candies and confections has, until quite recently, and is still almost universally done by hand, requiring a large amount of manual labor. It is a slow and tedious process to brush the candies and confections by hand. Moreover, in the hand brushing action, the work is seldom perfectly done. More or less of the finely powdered starch will be left adhering to the candies. The brushes quickly become loaded, so as to be incapable of good work, and the fine powder or dust stirred up, under the hand action, resettles to a greater or less extent on to the candies.

My improvements, in the apparatus, have for their object to overcome all these difficulties and to enable the work to be much more thoroughly done and at a comparatively small cost.

The invention, while especially designed for use in scouring and cleaning candies and confections is capable of general application, for scouring and cleaning many kinds of material such as grain, peas, beans, bolting cloth, &c.

In the accompanying drawings, I have shown my preferred form of apparatus. Therein like letters refer to like parts.

Figure 2:
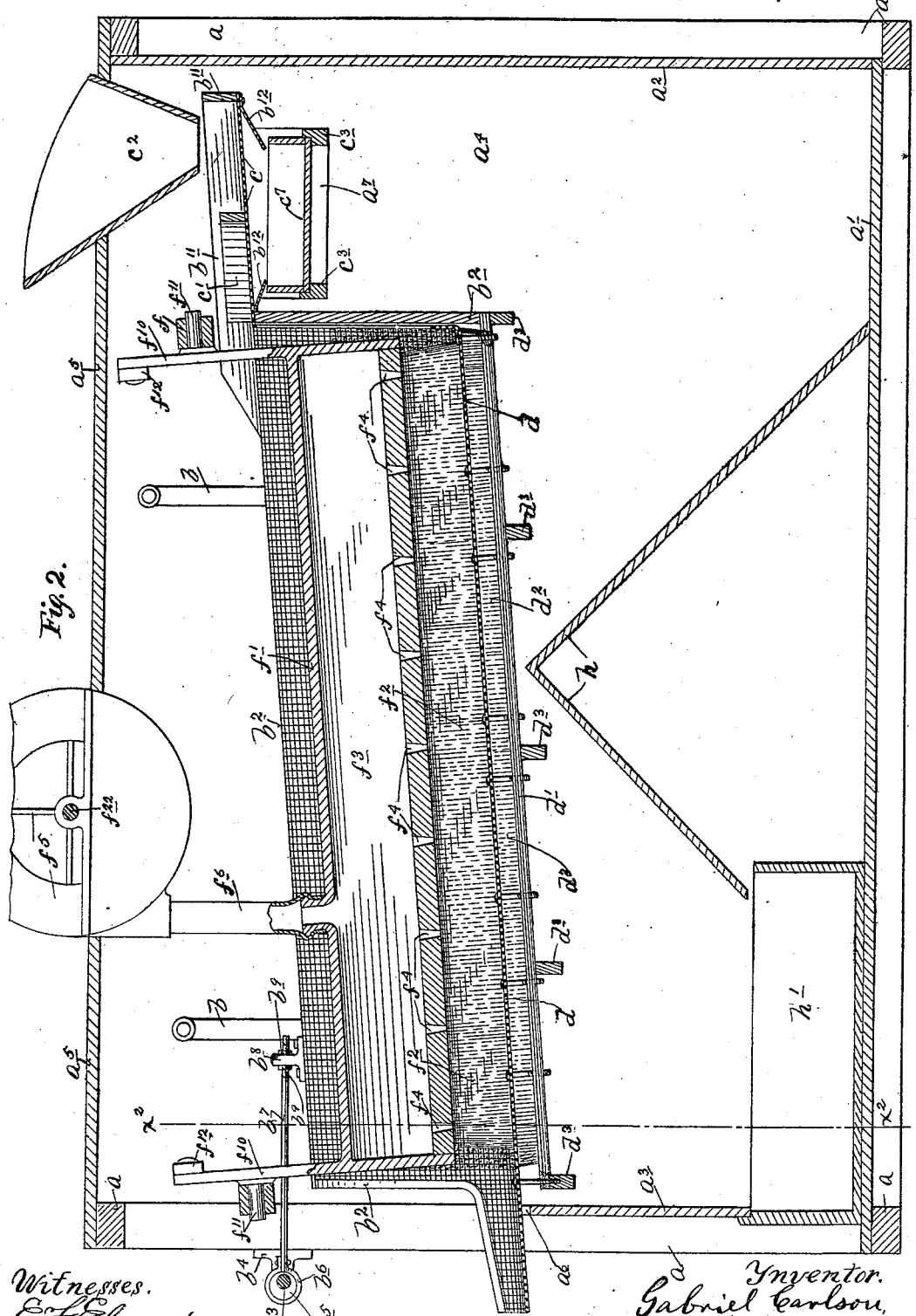
Figure 3:
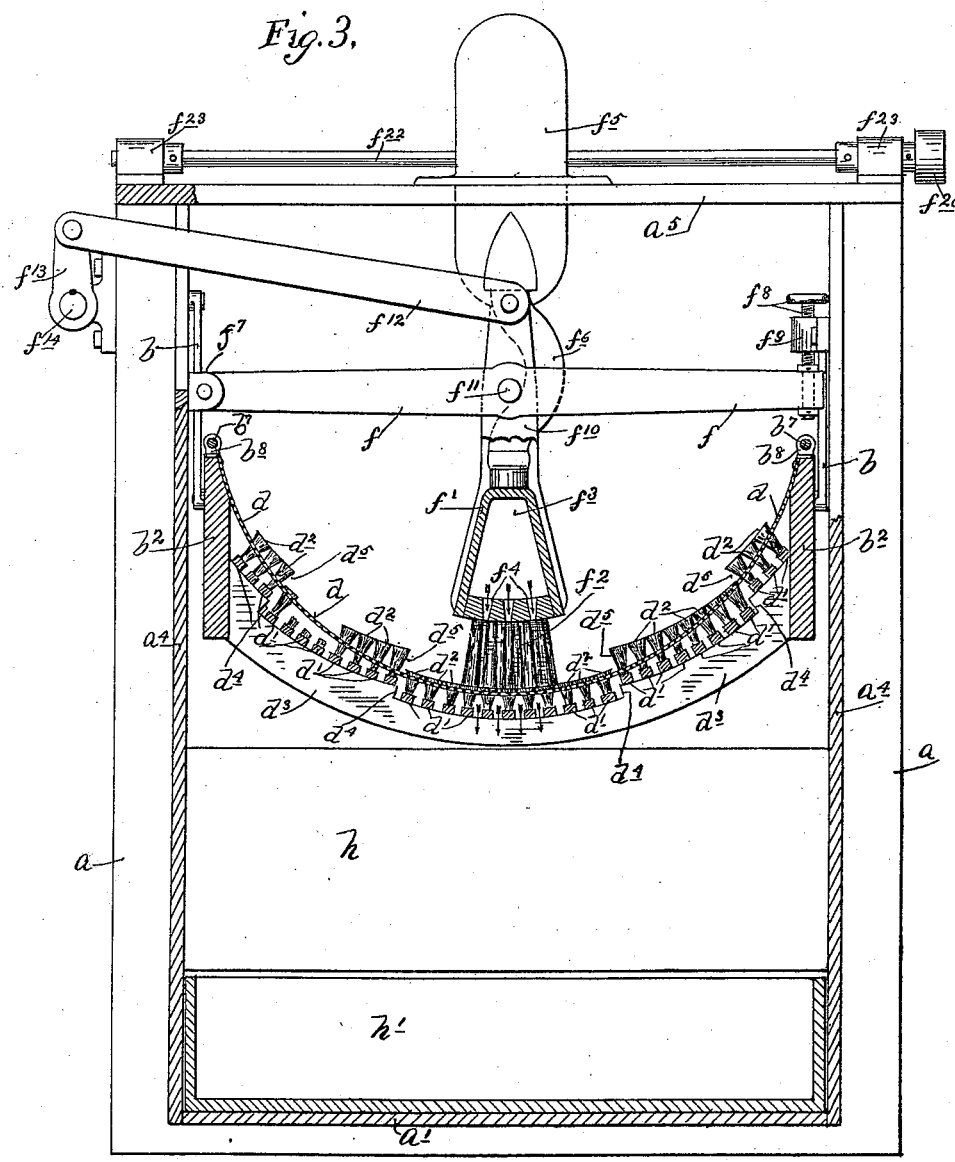

Figure 1 is a plan view of the machine, with some parts broken away. Fig. 2 is a longitudinal vertical section, on the line X' X' of Fig. 1; and Fig. 3 is a view, partly in rear elevation, and partly in section, on the line $X^2 X^2$ of Fig. 2.

In a suitable oblong case, composed of the frame pieces $a$, bottom board $a'$, end boards $a^2 a^3$, side boards $a^4$ and top board or deck $a^5$, is suspended by hangers $b$, a sieve frame $b^2$, for longitudinal shaking motion on said hangers $b$. This motion is imparted from a constantly running shaft $b^3$, journaled in bearing-blocks $b^4$ fixed to the rear end frame pieces $a$; which shaft is provided with a pair of eccentrics $b^5$, fitted with straps $b^6$, having their extended rods $b^7$ attached to the side bars of the sieve frame, through lugs $b^8$, fixed to the said frame, and jam-nuts $b^9$, engaging the screw threaded portions of the said eccentric-rods, on the opposite sides of the lugs $b^8$. The said shaft $b^3$ is kept in constant motion by power applied, from any suitable source, to a pulley $b^{10}$, on the left end of the said shaft. Under this eccentric motion, the whole of the said sieve frame $b^2$, will receive a reciprocating motion lengthwise of the frame and the sieve, which may be regulated at will, in rapidity and length of stroke, by varying the speed of the shaft $b^3$ and the size of the eccentrics $b^5$.

The hangers $b$ are so mounted as to support the sieve frame on a downward incline from its receiving to its delivery end, and the end board $a^3$ of the case is cut away, as shown at $a^6$, to permit the outward passage toward the rear of the delivery portion of the said frame. To the body of the said sieve frame $b^2$, at its upper end, is attached a forwardly projecting section $b^{11}$, in which is secured a separating sieve $c$, of any suitable kind, on a slight downward incline from its receiving to its delivery end. An angular divider $c'$ is secured to the frame $b^{11}$, near the lower end of the sieve $c$, with its angle or pointed end toward the head of the sieve, for the purpose of laterally spreading the confections or other materials, and insuring the delivery therefrom at the side margins, instead of at the center of the same. To the head of the case, directly over the upper end of the sieve $c$, is located a hopper $c^2$, into which are emptied the commingled candies and starch from the molding trays, or other materials, which it is desired to separate by the sieve $c$. Directly under the sieve $c$ and spaced apart therefrom a short distance, are located a pair of transverse runways $c^3$, which extend crosswise of the frame or case and project outward beyond the side walls of the same. At the right side of the case, the projecting parts of said guide-rails $c^3$ are connected by a bottom board $c^4$; which parts co-operate to form a receiving table, for the empty trays, at the right side of the case, adjacent to the hopper. The projecting portions of said guide-rails $c^3$, at the left side of the case, have attached thereunder an open-sided box-like receptacle $c^5$, not fully shown, of any suitable construction, and over the top of the same, on a level with the lower part of the guides, are fixed a series of rods $c^6$, which serve to form, together with said guide-rails, a delivery table, for the filled trays, at the left side of the machine and near the said hopper, which table is open, permitting the material which may be scraped off from the filled tray by the striker, to pass into the catch-box $c^5$, located below the same. The side walls $a^4$ of the case, are cut away as shown at $a^7$, to permit the inward and outward passage of the trays $c^7$ on the runway $c^3$. To the under side of the sieve frame section $b^{11}$, are fixed deflecting boards $b^{12}$, for directing the starch or other fine materials passed through the sieve $c$ into a tray $c^7$, on the runway $c^3$. This part of the apparatus, for convenience in emptying the filled trays, containing the dried candies and starch, into the hopper $c^2$, separating the candies from the starch and refilling the empty trays, is substantially like the mechanism shown for the same purpose, in my pending application, Serial No. 503,855, filed March 16, 1894, entitled confectioner's machine; and in the said case will be found claims directed to this part of the mechanism. In the said pending case will also be found some claims which, in a broad point of view or generic sense, cover some of the other features of the mechanism herein disclosed.

Turning now to my present improvements, I secure to the sieve frame $b^2$, a concave sieve $d$, composed of wire, or other suitable material of reticulated or square meshed form. Underneath the concave sieve, I locate a series of longitudinally arranged brush-heads $d'$, with their bristles $d^2$ extending upward through the meshes of the sieve. These brushes $d'$ $d^2$ are all carried by arc-shaped cross-bars $d^3$, fixed to the side-bars of the sieve frame $b^2$; and the brushes are sufficient in number and placed near enough together, so that the portions of their bristles $d^2$, which project upward and inward radially through the sieve $d$, will form a continuous brush surface, for holding and carrying the candies or other materials, which are to be subjected to the scouring and cleaning action. Otherwise stated, the bearing or active surface of the sieve, is faced with the brush bristles, which are so closely placed as to prevent the candies or other materials from riding on the metallic surface of the sieve $d$. The parts of the cross-bars $d^3$, on which the brush-heads $d'$ rest, are preferably stepped, as shown at $d^4$, and the different steps are arcs of circles, described from a common center with radii of different lengths. The effect of this arrangement is to bring the portions of the brush bristles $d^2$, which project through the sieve into a correspondingly stepped relation, as shown at $d^5$. Otherwise stated, the brush bearing surface of the sieve is divided into sections, the adjacent brushes of which bear a stepped relation to each other. This result might be secured, of course, in other ways than that shown, as for example, by making the brush-bristles of some brushes longer than those of others.

To cross trees $f$, adjustably secured to the side walls $a^4$ of the case, I pivot a sweeping or rocking brush $f'$ $f^2$; of which parts, $f'$ is an enlarged and recessed or hollow brush-head and $f^2$ are the bristles or brush filaments secured thereto. The interior of this brush-head $f'$ serves as an air-chamber $f^3$, and the lower wall of the same is provided with a series of perforations or outlet passages $f^4$, for discharging the air among the filaments of the brush, and, through the same, onto the candies or other materials when under the brushing action. The hollow brush-head $f'$ is supplied with air, under pressure, from a suitable air blast device $f^5$, shown as in the form of a fan, fixed to the case top or deck $a^5$. The connection from the fan to the brush-head is through a flexible tube $f^6$, for permitting the necessary yielding action, under the motion of the brush. The cross trees $f$ are pivoted, at one end, to bearing lugs $f^7$, fixed to one of the side walls and are held at the other by hand-screws $f^8$, working in lugs $f^9$, fixed to the opposite side wall of the case. This arrangement permits the brush $f'$ $f^2$ to be vertically adjusted, as may be desired, for the proper co-operation with the brushes $d'$ $d^2$ of the sieve. The brush-head $f'$ has upwardly extended arms $f^{10}$ at its opposite ends, which have trunnions $f^{11}$ working in suitable seats or bearings in said cross-trees $f$. To the upper ends of the lever-arms $f^{10}$ are attached links $f^{12}$ which extend to crank-arms $f^{13}$ on a constantly running shaft $f^{14}$, journaled in suitable bearing $f^{15}$, projecting from the right side wall of the case. The said shaft $f^{14}$ is driven from the eccentric bearing shaft $b^3$, through a drive connection therefrom, comprising a pulley $f^{16}$, on the right end of said shaft $b^3$, a belt $f^{17}$ connecting said pulley $f^{16}$ with a pulley $f^{18}$ on a stub-shaft $f^{19}$ mounted in bearings $f^{20}$, projecting from the frame, and a pair of beveled gears $f^{21}$, of which one is on the shaft $f^{19}$, and the other on the shaft $f^{14}$. Through these driving connections, the brush $f'$ $f^2$ will receive a constant rocking motion, and the bristles thereof will operate on the sieve brushes with a sweeping action transverse to the line of travel of the candies, confections, or other materials.

The fan $f^5$ is carried by shaft $f^{22}$ journaled in bearings $f^{23}$ and driven from the shaft $b^3$ through a belt $f^{24}$ connecting pulley $f^{25}$ on the shaft $b^3$, with a relatively small pulley $f^{26}$ on the fan shaft $f^{22}$.

The cross trees $f$ carrying the brush $f'$ $f^2$ are so set, with respect to the concave sieve, that the filaments or bristles of the rocking-brush will be intercurrent with the inwardly projecting parts of the brush filaments or bristles $d^2$, which are held in the meshes of the concave sieve $d$. The perforations or air discharge passages $f^4$, in the brush head $f'$, are preferably placed close to each other in staggered relation, throughout the whole length of the lower wall of the brush head, so that, under the pressure of the blast, a great number of fine jets or streams of air will be discharged among the filaments of the brush and on to the material being subjected to the brushing action.

As shown, a divider $h$ is located in the case, under the sieve frame $b^2$, for directing any of the starch or fine materials, which may work through the sieve $d$, partly toward the forward end of the case and partly toward the rear end of the case into a removable drawer or other receptacle $h'$.

Having regard to the scouring and cleaning action, the operation is probably clear, from the description already given. Supposing the commingled candies and starch to have been dumped together into the hopper $c^2$, the candies will be delivered over the sieve $c$, onto the upper end and at the side margins of the concave sieve $d$. Under the longitudinally shaking motion of the sieve frame $b^2$ and the parts carried thereby, and the rocking motion of the brush $f'$ $f^2$, the candies will be subjected over and over again to the scouring action of the brush filaments $f^2$ and $d^2$, throughout the whole course of their travel, from the receiving to the delivery end of the concave sieve; and while under the brushing action, the said candies will, at the same time, be subjected to a blast of air from the fan $f^5$ delivered from the hollow brush-head $f'$ through the multitude of small passages $f^4$, among the brush filaments $f^2$, and through the same onto the candies and the co-operating brush filaments $d^2$. Under the conjoint action of the brushes and the blast, all the starch will be loosened up and removed from the candies, and the candies will be delivered, thoroughly cleaned, from the lower end of the concave sieve.

It should be noted, that as the rocking brush $f'$ $f^2$ is held from the main case, it does not have any longitudinal motion. Hence, under the longitudinally shaking motion of the sieve frame $b^2$, there will be not only a transverse sweeping action of the intercurrent brushes, with respect to each other, due to the rocking motion, of the brush $f'$ $f^2$, but, at the same time, there will be a longitudinal sweeping action of the said brush filaments $f^2$ $d^2$, in respect to each other, due to the longitudinal shaking motion of the sieve frame $b^2$. Owing to the concave form of the sieve $d$, the candies or other materials swept upward by the brush $f'$ $f^2$, will continuously roll back to the lowest point of the sieve, while at the same time traveling lengthwise of the same, under the shaking motion, and be thereby subjected over and over again, to the action of the brushes and the blast of air. The brush-steps $d^5$ form breaks, which tend to prevent the candies from being carried upward too far, under the rocking action of the brush $f'$ $f^2$. These steps also increase the bite or extent to which the brush filaments $f^2$ and $d^2$ are made intercurrent at those points, which heightens the scouring action. In addition to its effect on the candies, or materials being scoured, the air blast being delivered, as it is, onto and from among the filaments of the brush $f'$ $f^2$, and passing thence through the filaments of the sieve brushes $d'$ $d^2$, keeps the said brushes clean, thereby preventing the loading of the brushes, which would otherwise occur.

By actual usage, I have demonstrated the efficiency of this machine, and have found that a machine of which the accompanying drawings are one-fourth scale, will do more work in a given time than can be done by four or five persons, and do the same much better. Moreover, the candies are never bruised, mashed or mutilated. Inasmuch as the whole of the bearing surface over which the candies travel is occupied, by the brush filaments $d^2$, the candies never come in contact with the metallic surface of the sieve $d$. Hence, there is no chance for bruising, mashing or mutilating action. Otherwise stated, the scouring and cleaning all takes place on the yielding surfaces afforded by the brush filaments. On the other hand, the meshed metallic sieve $d$, is an advantage for properly holding and spreading the filaments of the brushes $d'$ $d^2$, for their best co-operation with the filaments of the rocking brush $f'$ $f^2$.

It is of course obvious, that this apparatus is especially well designed to meet the requirements of cleaning and scouring candies, confections or other similar plastic or comparatively soft materials; but it will be understood, that any other kinds of materials which could be passed over the concave and brush-lined sieve would be subjected to the same kind of a brushing and scouring action. On the other hand, I believe myself to be the first to provide a brush lined sieve of any kind, whether mounted for power driven or hand action. Such a brush lined sieve would be a material advantage, in attempting to clean candies and similar materials by hand, as the brush lined hand sieve could be held and agitated with one hand, while a hand brush could be manipulated over the bearing surface thereof, and on the candies or other materials carried thereby, with the other hand.

What I claim, and desire to secure by Letters Patent of the United States, is as follows:

1. An apparatus, for scouring and cleaning material with a brushing and blast action, comprising the combination with a brush, and a support for the material, co-operating to produce the brushing action, of an air blast device arranged to produce a forced blast on the material when under the brushing action, substantially as described.

2. An apparatus, for scouring and cleaning material with a brushing and blast action, comprising the combination with a brush, and a material support, co-operating to produce the brushing action, of an air blast device delivering its blast both onto the filaments of the brush and onto the material under the brushing action, for rendering the blast operative both to clean the material and the brush, substantially as described.

3. In a scouring and cleaning machine, the combination with a material support, of an air blast device, and a brush having a hollow head receiving air, under pressure, from said blast device, and provided with outlet perforations for discharging the air among the filaments of the brush and onto the material being scoured and cleaned, substantially as described.

4. A brush lined sieve.

5. A sieve composed of a meshed or perforated body and brush filaments projecting through the meshes of said body and constituting the bearing surface of the sieve, substantially as described.

6. The combination of a brush and a brush lined sieve, co-operating to produce a sweeping action on the materials passing over the brush lined sieve, substantially as described.

7. The combination of a brush and a brush lined sieve, both of which parts are movable with respect to each other, for producing a sweeping action on the materials to be scoured and cleaned, substantially as described.

8. The combination of a brush and a brush lined sieve, both of which parts are movable with respect to each other in lines at angles to each other, for increasing the sweeping action on the materials, substantially as described.

9. The combination with a brush lined sieve mounted for a longitudinal shaking motion, of a brush mounted for a transverse sweeping movement crosswise of the brush surface of said sieve, substantially as described.

10. The combination with the concave brush lined sieve mounted for longitudinal shaking motion, of the rocking brush, mounted for transverse sweeping motion crosswise of said sieve, substantially as and for the purposes set forth.

11. In a scouring and cleaning machine, the combination with the brush lined longitudinally shaking sieve, of the transversely rocking brush held against longitudinal motion and having a hollow head or air chamber with discharge outlets among the filaments of the brush, and an air blast device for supplying air under pressure to said hollow brush head, substantially as described.

12. A brush lined sieve having its brush filaments arranged to form a series of steps, substantially as and for the purpose set forth.

13. The combination with a transversely sweeping brush, of an underlying brush lined sieve having its brushes arranged longitudinally thereof with the filaments of some of the brushes projecting inward farther than those of others, for forming a series of steps or breaks, lengthwise of said sieve, substantially as and for the purpose set forth.

14. The combination with the rocking brush $f'$ $f^2$ of the adjustable cross-trees $f$, for supporting the same, substantially as described.

15. The combination with the rocking brush $f'$ $f^2$, of the cross trees $f$, pivoted at one end and adjustably held at the other by the hand screws $f^8$, substantially as described.

16. The combination with the hollow headed rocking brush $f'$ $f^2$ $f^3$ $f^4$, of the fan $f^5$ and the flexible connection $f^6$ from the fan to the air chamber of the brush head, substantially as described.

In testimony whereof I affix my signature in presence of two witnesses.

GABRIEL CARLSON.

Witnesses:
JAS. F. WILLIAMSON,
E. F. ELMORE.